TRANSISTOR OSCILLATOR

Original Filed July 12, 1954

2 Sheets-Sheet 1

INVENTORS
P. J. H. JANSSEN
C. P. A. G. VAN DE VIJVER
BY
Frank R. Jeffery
AGENT

TRANSISTOR OSCILLATOR

Original Filed July 12, 1954 2 Sheets-Sheet 2

INVENTORS
P. J. H. JANSSEN &
C. P. A. G. VAN DE VIJVER
BY
Frank R. Jifani
AGENT

United States Patent Office 3,070,758
Patented Dec. 25, 1962

3,070,758
TRANSISTOR OSCILLATOR

Peter Johannes Hubertus Janssen and Carolus Petrus Adrianus Gerardus van de Vijver, Eindhoven, Netherlands, assignors, by mesne assignments, to North American Philips Company, Inc., New York, N.Y., a corporation of Delaware Original application July 12, 1954, Ser. No. 442,774, now Patent No. 2,965,806, dated Dec. 20, 1960. Divided and this application Dec. 19, 1960, Ser. No. 84,473
Claims priority, application Netherlands July 22, 1953
2 Claims. (Cl. 331—111)

The present application is a division of U.S. patent application Serial No. 442,774, filed July 12, 1954, now Patent No. 2,965,806, issued December 20, 1960.

The invention relates to a monostable or a-stable trigger circuit comprising a junction transistor. This circuit may serve advantageously for converting a direct supply voltage or a slowly varying voltage into a pulsatory voltage having a materially higher amplitude than the said supply voltage, this pulsatory voltage, for example subsequent to rectification, supplying a higher supply voltage to be supplied to a load. The term "junction transistor" is to be understood to mean a transistor obtained for example by drawing up the transistor crystal from the melt or by alloying or partial electrolytic etching of this crystal by means of a material which produces a conductivity differing from more particularly a conductivity opposite to the conductivity of the crystal, so that zones with different conductivity are obtained which are separated by junctions.

There are trigger circuits comprising point-contact transistors and being set oscillating by means of a comparatively high base impedance or with the aid of a feed-back transformer and a frequency-determining R-C network. The pulse energy obtainable by such circuits is, however, comparatively small. There are also known generator circuits for sine oscillations with the aid of transistors, which exhibit the same disadvantage.

The invention is characterized in that the source of the said supply voltage, in series with the primary winding of a feed-back transformer, this winding having a comparatively high natural frequency, is included in the collector circuit of the transistor, whereas the secondary winding of the transformer without the interconnection of frequency-determining capacitors is connected between the emitter electrode and the base electrode of the transistor, so that for a comparatively long period collector current flows and the voltage difference between the emitter electrode and the collector electrode is small with respect to the said supply voltage, whilst for a comparatively short period this current is abruptly interrupted and the voltage between the said electrodes exceeds materially the said supply voltage. In this case the product of the said supply voltage and the mean current flowing during the said longer period is preferably considerably higher than the power dissipated in the transistor, or the maximum permissible power, whilst the pulsatory voltage produced across the said transformer during the said shorter period is supplied to a load.

The invention will now be described with reference to the drawing.

Figure 1:
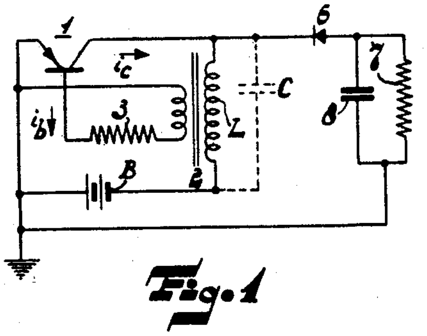
FIG. 1 shows one embodiment of the invention.

Referring to FIG. 1, a source of supply voltage B is connected between the emitter electrode and the collector electrode of a junction transistor 1 in series with the primary winding L of a step-down feed-back transformer 2, the secondary winding of which is included in the circuit between the emitter electrode and the base electrode of the transistor 1, if necessary in series with a limiting resistor 3. With reference to the $i_c$—$V_c$ characteristics of FIG. 2 it will be shown that the collector current $i_c$ across the transistor 1 varies in a sawtooth manner and the collector voltage $V_c$ varies in a pulsatory manner with time, as is shown in FIG. 3, it being assumed that the parasitic capacitor C parallel to the primary winding L has a very low value.

Figure 2:
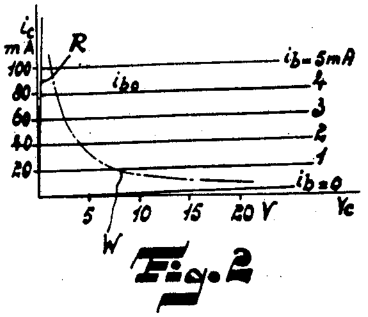
FIG. 2 shows transistor characteristic curves.
Figure 3:
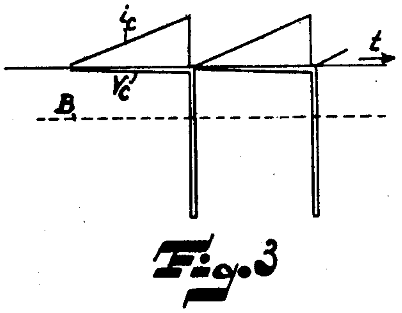
FIGS. 3 and 4 show the variation of the current and voltage with time to explain the embodiment shown in FIG. 1.

Upon switching on the circuit shown in FIG. 1, the collector current $i_c$ will tend to increase to a value corresponding to the characteristic $i_b=0$ of FIG. 2, wherein $i_b$ designates the base current of the transistor 1. This increase in current $i_c$ produces in the transformer 2 a magnetic flux, so that across the secondary winding of the transformer is produced a voltage causing the base current $i_b$ of the transistor to increase. Consequently, a higher collector current $i_c$ is produced, resulting in a higher base current $i_b$ and so on.

The increase in collector current $i_c$ with time may be indicated in a first approximation by the formula:

$$i_c=\frac{B}{R+r}\left(1-\epsilon^{-\frac{R+r}{L}t}\right)$$

wherein $B$=the voltage of the source B, $L$=the inductance of the primary winding L of the transformer 2, $R$=the differential resistor of the ascending branch R in the $i_c$—$V_c$ curves of FIG. 2 and $r$=the loss resistance of the said primary winding L; approximately the complete voltage of the source B is applied to the inductance L and the very low collector voltage $V_c$ corresponding to the said ascending branch R is applied only between the emitter electrode and the collector electrode.

During this period a voltage of substantially $B/n$ is operative across the secondary winding of the transformer 2, $n$ being the transformation ratio of the transformer 2, this voltage produces a base current $$i_{bo}=\frac{B}{n(R_3+R_{b-e})}$$

wherein $R_3$ designates the value of the resistor 3 and $R_{b-e}$ the input resistance of the transistor 1 between base and emitter electrodes.

When the collector current $i_c$ has increased to a value at which the $i_c$—$V_c$ curve associated with this base current $i_{bo}$ in the ascending branch R proceeds to the approximately horizontal $i_{bo}$ (FIG. 2), $i_c$ does no longer increase substantially so that the voltage across the said secondary winding and hence the base current $i_b$ drop very strongly in an abrupt manner, and the collector current $i_c$ is interrupted abruptly (FIG. 3) and the collector voltage $V_c$ can exceed largely the voltage of the source B (indicated by the broken line B in FIG. 3).

The voltage obtained may serve to feed a useful load 7 through a rectifier 6 (FIG. 1), the mean voltage across this load may then be many times higher than the voltage of the source 1. The power supplied to this load 7 may be materially higher than the maximum permissible power W of the transistor. Of course, the transformer 2 may, if necessary, be provided with a tertiary winding (not shown), the voltage of which, subsequent to rectification, is supplied to the load.

The current and voltage values associated with the maximum power W are indicated in FIG. 2 by the dot-and-dash line. For the long period in which the current $i_c$ of FIG. 3 increases and varies in accordance with the ascending branch R of FIG. 2 (vide the $i_c$—$V_c$ characteristic curves), the voltage $V_c$ is so low that at least on an average the maximum power W of the transistor is not yet reached. During this period, however, a considerable amount of energy is accumulated in the transformer 2, this amount of energy being per period equal to the product of the mean $i_{c\ gem}$ of the current $i_c$ and the voltage of the source B, minus the said low collector voltage $V_c$. During the short period in which the current $i_c$ is interrupted abruptly (FIG. 3) the voltage $V_c$ increases to a high extent over the voltage of the source B, but the current $i_c$ is interrupted, so that again the transistor 1 is driven below its maximum permissible power W. During this period the transformer 2 supplies its accumulated energy per period, about $B \times i_{c\ gem}$ to the load 7, which power may thus be materially higher than W.

Figure 4:
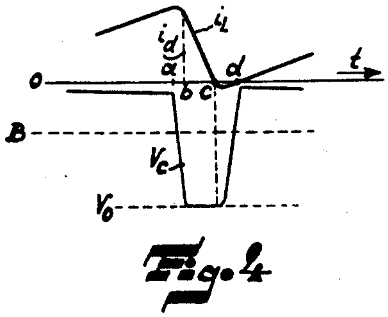

FIG. 4 shows on an exaggerated scale the voltage $V_c$ across and the current $i_L$ through the primary winding L. at the instant *a*, when the collector current $i_c$ reaches the value associated with the branch $i_{bo}$ of FIG. 2 and is thus interrupted abruptly, the voltage $V_c$ across the circuit formed by the winding L and its parasitic capacitor C increases until at the instant *b* the voltage $V_o$ across the load 7 (which voltage may for the sake of simplicity be considered to be constant for example by using a parallel capacitor 8) is attained. At this instant a considerable current $i_d$ begins to flow through the rectifier 6, the current $i_L$ through the winding L thus decreasing approximately in accordance with the formula:

$$i_L = \frac{V_o - B}{r + r_d} \epsilon^{-\frac{r+r_d}{L}t}$$

wherein $r_d$ designates the internal resistance of the rectifier 6. At the instant *c*, when the current $i_L$ becomes equal to zero, the voltage $V_c$ decreases until the instant *d* when the voltage $V_c$ becomes equal to the voltage B of the direct voltage supply, from which instant the aforesaid current cycle starts again. In the time interval *b—c* an amount of energy of $\frac{1}{2} L i_d^2$ is transferred from the transformer 2 to the load 7. The negative current passing through the winding L in the time interval *c—d* is supplied by the parasitic capacitor C.

From the foregoing it will be obvious that, if a high voltage $V_o$ across the load 7 is to be obtained, the time intervals *a—b* and *c—d* must be short relative to the time interval *b—d*, i.e. the frequency of the natural oscillation of the circuit LC must be short relative to the duration of the said short period, or in other terms, the circuit LC must have a comparatively high natural frequency.

The circuit arrangement described above may for example be used for feeding battery apparatus comprising tubes and as the case may be, transistors, so that a low battery voltage of the apparatus may suffice, whilst the tubes are fed in the manner described. The pulses produced may, moreover, be used as quench-oscillations for a superregenerative oscillator of the apparatus. The said apparatus may be for example car radio apparatus, portable receivers or amplifiers, for example for measuring purposes, hearing apparatus. In this manner for example the tuning indicator and/or the electroluminescent circuit elements of a radio receiver comprising transistors may be fed. This circuit-arrangement may, moreover, be used successfully in conjunction with a photoflux apparatus, the capacitor 8 being charged during a pre-determined time to the voltage required and discharged abruptly across the flashlight lamp. Instead of deriving the supply voltage from a battery, it may be obtained, for example with the aid of a thermopile. Instead of producing in the manner described a high negative voltage $V_o$, a positive voltage may, of course, be produced in a completely analogous manner by reversing the source B and by using a transistor of opposite conductivity type.

Not only in the manner described above the direct voltage from the source B can be converted by means of the production of the sawtooth currents $i_c$ and $i_L$ with very high efficiency into a direct voltage $V_o$ across the load 7, but these sawtooth currents themselves may of course be used successfully. By suitable proportioning a triangular sawtooth current $i_L$ may be produced in a simple manner. By varying the resistor 3 it is possible to vary not only the value of the power produced and supplied, but also the repetition frequency of the sawtooth currents or the pulse voltages.

It is furthermore advisable, in contradistinction to known circuit arrangements, not to include a bias voltage source in the circuit between the base and the emitter electrodes or to include only a low voltage supply, since if in the circuit-arrangement shown the load 7 is short-circuited the arrangement ceases generating and the collector current $i_c$ drops substantially to the value zero, whilst, if a bias voltage corresponding to the passage is included in the said circuit, there is a risk of overload for the transistor, since already at a low value of the base standing current the product of the alternating collector voltage and current exceeds the maximum permissible power W.

On the other hand such a bias voltage facilitates self-starting of the oscillation. In accordance with the variant shown in FIG. 8 it may, moreover, serve to render the voltage $V_o$ at the load 7 less dependent upon voltage variations of the source B. This voltage $V_o$ increases more than proportionally to B, since the input resistor $R_{b-e}$ of the transistor 1 drops at an increase in voltage between the base and emitter electrodes. If, in accordance with FIG. 8, the side of the source B remote from the emitter electrode is connected to the base electrode of the transistor 1 through a resistor 18, if necessary decoupled by a capacitor 17, and the secondary winding of the transformer 2, this resistor 18 may be many times higher than the said input resistor $R_{b-e}$, so that the influence thereof on the voltage $V_o$ is suppressed. A similar effect may be obtained by choosing the transformation ratio *n* to be smaller and the resistor 3 of FIG. 1 to be higher, but in this case a great amount of energy is dissipated in the emitter-base circuit. The self-starting is also furthered by the capacitor 17. Of course, part of the voltage of the source B may be supplied to the base electrode of the transistor 1, for example by connecting the top end of the resistor 18 through a resistor (not shown) to the left-hand end of the source B.

The limiting resistor 3 is preferably included in the base circuit and not in the emitter circuit, since in the latter case a greater amount of energy would be dissipated in this resistor 3. This resistor may, if necessary, be replaced successfully by or connected in series with a rectifier (not shown) having the same pass direction as the base-emitter path of the transistor.

The effects described above are obtainable with considerably greater difficulty with the aid of point-contact transistors, since their $i_c$—$V_c$ characteristic curves have a considerably less favourable variation. These curves have a materially less steep branch R and a materially less flat branch $i_{bo}$ and a much more gradual transition between these two branches, whilst the branch $i_{bo}$ corresponds to higher $i_c$ values. Thus the circuit arrangement according to the invention has a materially greater useful effect. Moreover, the fact that an impedance in the base circuit of a point-contact transistor may give rise to self-oscillation, renders it more difficult to control the aforesaid processes.

In a practical embodiment the said impedances had the following values: $L$=100 millihenries; $C$=18 micromicrofarads; $n$=5; $R$=4 ohms; $r$=4 ohms; $r_d$=20 ohms; resistor 3=68 ohms; resistor 7=18 kilohms; capacitor 8=1 microfarad; B=6 volts; $V_o$=43 volts; periodic time of LC circuit=10 microseconds; time $a$—$b$=0.1 microsecond; time $b$—$c$=0.17 millisecond; time $c$—$d$=2.6 microseconds; power supplied to the load 7=100 milliwatts; transistor collector dissipation=2.5 milliwatts; maximum permissible power of the transistor=10 milliwatts; and power supplied by source B=122 milliwatts.

Figure 5:
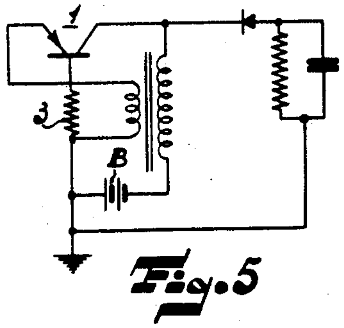
FIG. 5 is a variant of the embodiment shown in FIG. 1.

FIG. 5 shows a variant of the circuit arrangement shown in FIG. 1, wherein one terminal of the source B is not connected to the emitter electrode, but through the resistor 3 to the base electrode of the transistor 1. Otherwise this circuit arrangement operates substantially as that shown in FIG. 1.

Figure 6:
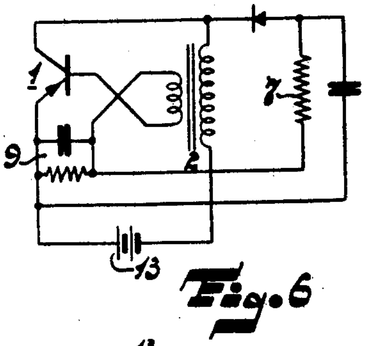
FIG. 6 is a further variant of the embodiment shown in FIG. 1, intended as a voltage generator having a low internal resistance.

FIG. 6 shows a variant of the circuit-arrangement shown in FIG. 1, in which in series with the secondary winding of the transformer 2 also an impedance 9 is included, through which flows also the current to the load 7. This circuit arrangement may be considered as a generator for producing a supply voltage for the load 7 exceeding the voltage of the source B, the measure indicated above serving to reduce the inner resistance of this generator.

If by a variation of the load 7 a higher load current is producd, this produces a greater voltage drop across the impedance 9, so that the said current $i_{bo}$ and hence the maximum value of the collector current $i_c$ are increased. The voltage drop across the load 7 attendant with a higher load current is counteracted by this increased collector current $i_c$. With a given ratio between the voltage $V_o$ at the load 7 and that of the source B varying with the current amplification of the transistor 1 the impedance 9 can only be constituted by a capacitor. This capacitor provides automatically an adjustment of the said voltage ratio.

Figures 8, 9, 10:
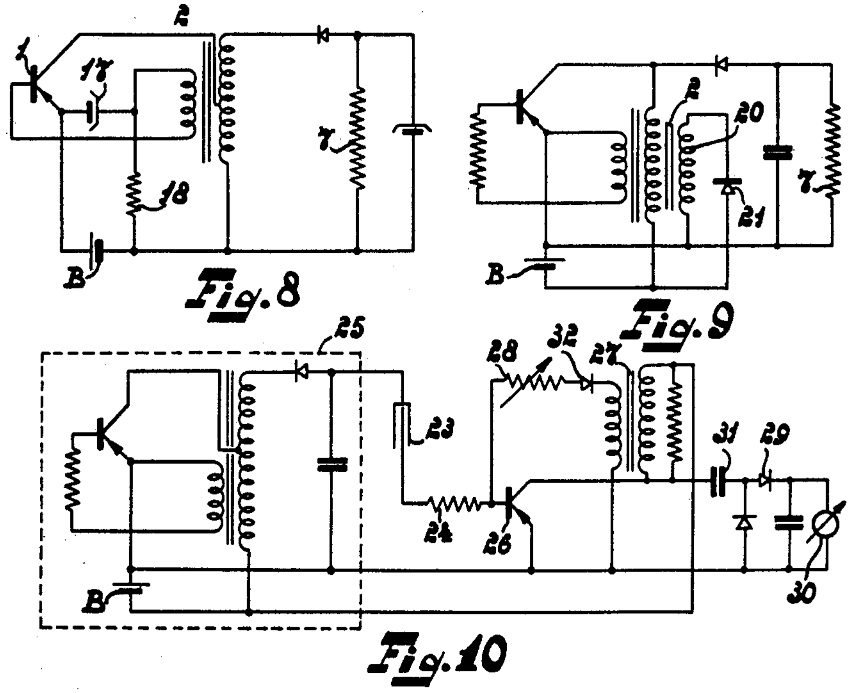
FIG. 8 is a fourth variant of the embodiment shown in FIG. 1, by which self-starting of the oscillation is facilitated.
FIG. 9 is a fifth variant of the embodiment shown in FIG. 1, in which the voltage produced is stabilized.
FIG. 10 shows a counting-tube circuit in which the principles of the invention are carried out.

FIG. 9 shows a variant of the circuit arrangement shown in FIG. 1, in which the voltage $V_o$ produced is stabilized, even if the load is switched off, since the transformer 2 is provided with a tertiary winding 20, the pulse voltage of which is supplied through the rectifier 21, the pass direction of which is opposite the polarity of the source B, to this source B, so that this pulse voltage and hence the voltage $V_o$ are limited by the source B. Of course, the measure taken in this arrangement may, if desired, be combined with that described with reference to FIG. 6.

Figure 7:
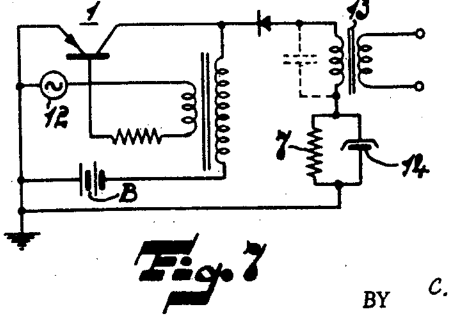
FIG. 7 is a third variant of the embodiment shown in FIG. 1, in which also a signal oscillation can be amplified.

FIG. 7 shows a variant of the circuit arrangement shown in FIG. 1, in which the base circuit of the transistor 1 includes moreover a source 12 of the signal oscillations to be amplified. The amplified oscillations are derived from a transformer 13 in series with the load 7, the load being decoupled for the signal oscillations by means of a capacitor 14. Since, as described above, the power supplied to the load 7 may exceed materially the maximum permissible power of the transistor itself, an amplifier may thus be obtained, supplying also a materially higher alternating current power to the transformer 13 than the power dissipated in the transistor 1. The maximum signal frequency must then, of course, be lower than the pulse repetition frequency.

In a practical embodiment the power supplied by the source B may, for example be converted by 80% into a higher direct voltage at the load 7 and by 14% into alternating-current power across the output transformer 13, whilst in the transistor 1 only 2% of this power was dissipated.

FIG. 10 shows a circuit arrangement comprising a counting tube 23 having an extinction resistor 24; this tube is fed in the manner shown in FIG. 1 by means of the direct-voltage converter 25. With the ignition of the counting tube 23 a pulse is supplied to the base electrode of a transistor 26, which is fed in the manner shown in FIG. 1 through a transformer 27, the base resistor 28, connected preferably in series with a rectifier 32 or replaced completely, if necesary, by this rectifier, being adjusted to such a high value that in the absence of a counting pulse the combination 26—27—28 just does not generate (monostable trigger circuit). The said counting pulse causes this combination to produce an amplified pulse, the amplitude of which varies substantially only with the voltage of the source B, so that through a rectifying circuit 29 a current proportional to the number of counting pulses is supplied to a meter 30. The comparatively small capacitor 31 serves to render this current substantially independent of the width of these pulses.

Figure 11:
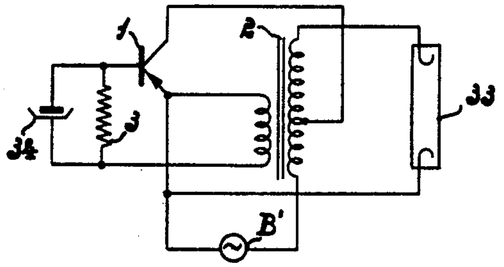
FIG. 11 shows an ignition circuit for a gas discharge tube, to which these principles are applied.

FIG. 11 shows an ignition circuit for a gas discharge tube 33, in which the source B′ supplied a slowly varying voltage, for example the mains alternating voltage, of which one phase causes the transistor-transformer combination 1—2 to generate, so that the pulses produced cause the tube 33 to ignite. This tube 33 is then fed through the primary winding of the transformer 2, which may operate as a series inductor; in order to avoid further energy absorption in the transistor 1 its base resistor 3 can be shunted completely or partly by a capacitor 34, the time constant of the filter 3—34 lying in the proximity of the frequency of the source B′ or exceeding this value, so that by collector-base peak rectification such a high bias voltage is produced across this filter 3—34 that the transistor 1 is substantially cut off.

Figure 12:
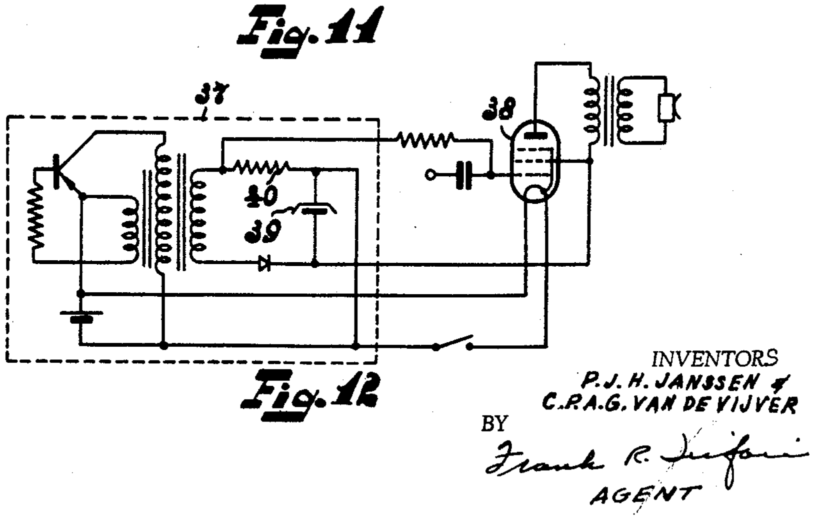
FIG. 12 shows part of a hearing apparatus, to which these principles are applied.

FIG. 12 shows the feeding part 37 and the amplifying part 38 of a hearing apparatus, in which in series with the comparatively large capacitor 39, through which the anode voltage of the amplifying tube 38 is produced, is connected a resistor 40, at the end of which, remote from the capacitor 39 negative superaudio-frequency pulses are produced, these pulses providing the negative grid bias voltage for the tube 38, without the need of the conventional cathode resistor with the smoothing capacitor.

What is claimed is:

1. A trigger circuit comprising a junction transistor having a base electrode, an emitter electrode and a collector electrode, a source of supply voltage of given value, a first inductive circuit connected between said emitter and collector electrodes and comprising a series combination of a first inductive winding and said source, a second inductive circuit interposed between said emitter electrode and said base electrode, said second inductive circuit including a second inductive winding, said first and second windings being inductively coupled in feedback relationship thereby producing current flow between said emitter and collector electrodes for a given interval determined by the inductance and resistance of the said first circuit and producing interruption of the said current flow for a second interval determined by the natural resonant frequency of said first winding, said first winding having a natural resonant frequency substantially greater than the periodicity of current flow between said emitter and collector electrodes whereby an impulse voltage having a value substantially greater than the value of the voltage of said supply source is produced at said collector electrode simultaneously with the interruption of said current flow, the product of said supply voltage and the mean current flow for said given interval exceeding the power dissipated by said transistor, a resistive element connected in series circuit arrangement with said source and said second winding between said emitter and base electrodes, said resistive element being connected between said source and said second winding, a capacitor connected between said emitter electrode and the junction point of said resistive element and said second winding, and output circuit means coupled to said collector electrode and responsive to said impulse voltage, said output means comprising a load element and a rectifier connected between said collector electrode and said load element for applying said impulse voltage to said load element.

2. A trigger circuit comprising a junction transistor having a base electrode, an emitter electrode and a collector electrode, a source of supply voltage of given value, a first inductive circuit connected between said emitter and collector electrodes and comprising a series combination of a first inductive winding and said source, a second inductive circuit interposed between said emitter electrode and said base electrode, said second inductive circuit including a second inductive winding, said first and second windings being inductively coupled in feedback relationship thereby producing current flow between said emitter and collector electrodes for a given interval determined by the inductance and resistance of the said first circuit and producing interruption of the said current flow for a second interval determined by the natural resonant frequency of said first winding, said first winding having a natural resonant frequency substantially greater than the periodicity of current flow between said emitter and collector electrodes whereby an impulse voltage having a value substantially greater than the value of the voltage of said supply source is produced at said collector electrode simultaneously with the interruption of said current flow, a resistive element connected in series circuit arrangement with said source and said second winding between said emitter and base electrodes, said resistive element being connected between said source and said second winding, a capacitor connected between said emitter electrode and the junction point of said resistive element and said second winding, and output circuit means coupled to said collector electrode and responsive to said impulse voltage, said output means comprising a load element and a rectifier connected between said collector electrode and said load element for applying said impulse voltage to said load element.

References Cited in the file of this patent

UNITED STATES PATENTS

| | | |
|---|---|---|
| 2,125,732 | Bowman-Manifold et al. | Aug. 2, 1938 |
| 2,745,012 | Felker | May 8, 1956 |

OTHER REFERENCES

"Wavesforms," by Chance et al., vol. 19, Radiation Laboratory Series, pages 210–211.